US009564158B1

(12) United States Patent
Nath et al.

(10) Patent No.: US 9,564,158 B1
(45) Date of Patent: Feb. 7, 2017

(54) METHODS AND DEVICES FOR ADJUSTING ACTUATOR CONTROL SIGNALS

(71) Applicant: Seagate Technology LLC, Cupertino, CA (US)

(72) Inventors: Amar Nath, Singapore (SG); Ming Zhong Ding, Singapore (SG); Guo Quing Zhang, Singapore (SG); Chan Fan Lau, Johor (MY)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/153,498

(22) Filed: May 12, 2016

(51) Int. Cl.
*G11B 5/55* (2006.01)

(52) U.S. Cl.
CPC ........... *G11B 5/5565* (2013.01); *G11B 5/5547* (2013.01)

(58) Field of Classification Search
CPC .................. G11B 5/55; G11B 5/5521–5/5534; G11B 5/5547; G11B 5/5565; G11B 5/59627
USPC ............... 360/75, 77.04, 78.04, 78.07, 78.09
See application file for complete search history.

(56) References Cited

U.S. PATENT DOCUMENTS

| | | | | |
|---|---|---|---|---|
| 5,872,674 A * | 2/1999 | Eddy | ..................... | G11B 21/085 360/78.09 |
| 6,563,661 B2 * | 5/2003 | Thia | ..................... | G11B 5/59611 360/75 |
| 6,636,375 B1 * | 10/2003 | Ding | ..................... | G11B 5/5556 360/77.02 |
| 6,738,220 B1 * | 5/2004 | Codilian | ............... | G11B 5/5547 360/78.04 |
| 6,937,430 B2 * | 8/2005 | Ge | ........................ | G11B 5/5565 360/78.09 |
| 6,995,944 B1 * | 2/2006 | Takaishi | ............. | G11B 5/59627 360/78.06 |
| 7,136,256 B2 * | 11/2006 | Takaishi | ............. | G11B 5/59627 360/78.09 |
| 7,440,225 B1 * | 10/2008 | Chen | ................... | G11B 5/59627 360/78.09 |
| 7,667,922 B1 * | 2/2010 | Nelson | ............... | G11B 5/59627 360/78.09 |
| 8,767,343 B1 * | 7/2014 | Helmick | ............... | G11B 5/5547 360/78.04 |

* cited by examiner

*Primary Examiner* — Wayne Young
*Assistant Examiner* — James L Habermehl
(74) *Attorney, Agent, or Firm* — Faegre Baker Daniels LLP (57) ABSTRACT

A method includes performing a first seek operation using a first voice coil motor (VCM) control signal by utilizing a first drag component value. The method further includes determining a position error signal (PES) and a DC offset component of the PES measured during the first seek operation, and determining that the DC offset component is above a predetermined threshold. In response to determining that the DC offset component is above the predetermined threshold, the method further includes determining a second drag component value different than the first drag component value. The method further includes generating a second VCM control signal by applying the second drag component value.

20 Claims, 6 Drawing Sheets

METHODS AND DEVICES FOR ADJUSTING ACTUATOR CONTROL SIGNALS

SUMMARY

In certain embodiments, a method includes performing a first seek operation using a first voice coil motor (VCM) control signal by utilizing a first drag component value. The method further includes determining a position error signal (PES) and a DC offset component of the PES measured during the first seek operation, and determining that the DC offset component is above a predetermined threshold. In response to determining that the DC offset component is above the predetermined threshold, the method further includes determining a second drag component value different than the first drag component value. The method further includes generating a second VCM control signal by applying the second drag component value.

In certain embodiments, an apparatus includes control circuitry configured to: initiate a first seek operation using a first voice coil motor (VCM) control signal by utilizing a first drag component value; determine a DC offset component of a position error signal measured during the first seek operation; determine that the DC offset component is above a predetermined threshold; and in response to determining the DC offset component is above the predetermined threshold, determine a second drag component value different than the first drag component value.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Figure 1:
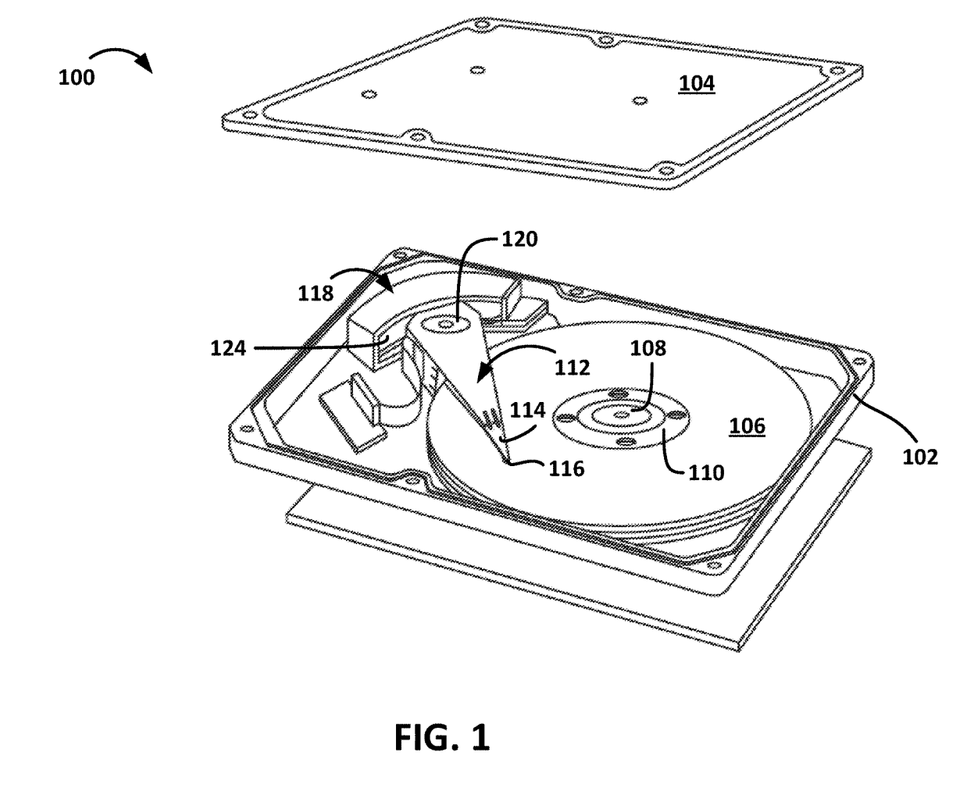
FIG. 1 shows an exploded, perspective view of a hard drive, in accordance with certain embodiments of the present disclosure.

FIG. 1 shows an exploded, perspective view of a hard drive 100 having a base deck 102 and top cover 104. The hard drive 100 includes magnetic recording discs 106 coupled to a spindle motor 108 by a disc clamp 110. The hard drive 100 also includes an actuator assembly 112 coupled to a suspension assembly 114 that suspends read/write heads 116 (only one read/write head 116 is shown in FIG. 1) over the magnetic recording discs 106. In operation, the spindle motor 108 rotates the magnetic recording discs 106 while the actuator assembly 112 is driven by a voice coil motor assembly 118 that rotates the actuator assembly 112 around a pivot bearing 120. The voice coil assembly 118 can include a voice coil 122 (shown in FIG. 2), which includes a wound conductive wire through which current is applied. In operation, positioning of the actuator assembly 112 is controlled by the applied current through the voice coil 122, which generates a magnetic field that interacts with magnetic fields of permanent magnets 124 that are spaced apart from the voice coil 122. The hard drive 100 further includes a servo control system (discussed in more detail below) that controls operation of the voice coil motor assembly 118 such that the read/write heads 116 are positioned over a desired track on the magnetic recording discs 106 for reading and writing operations.

Figure 2:
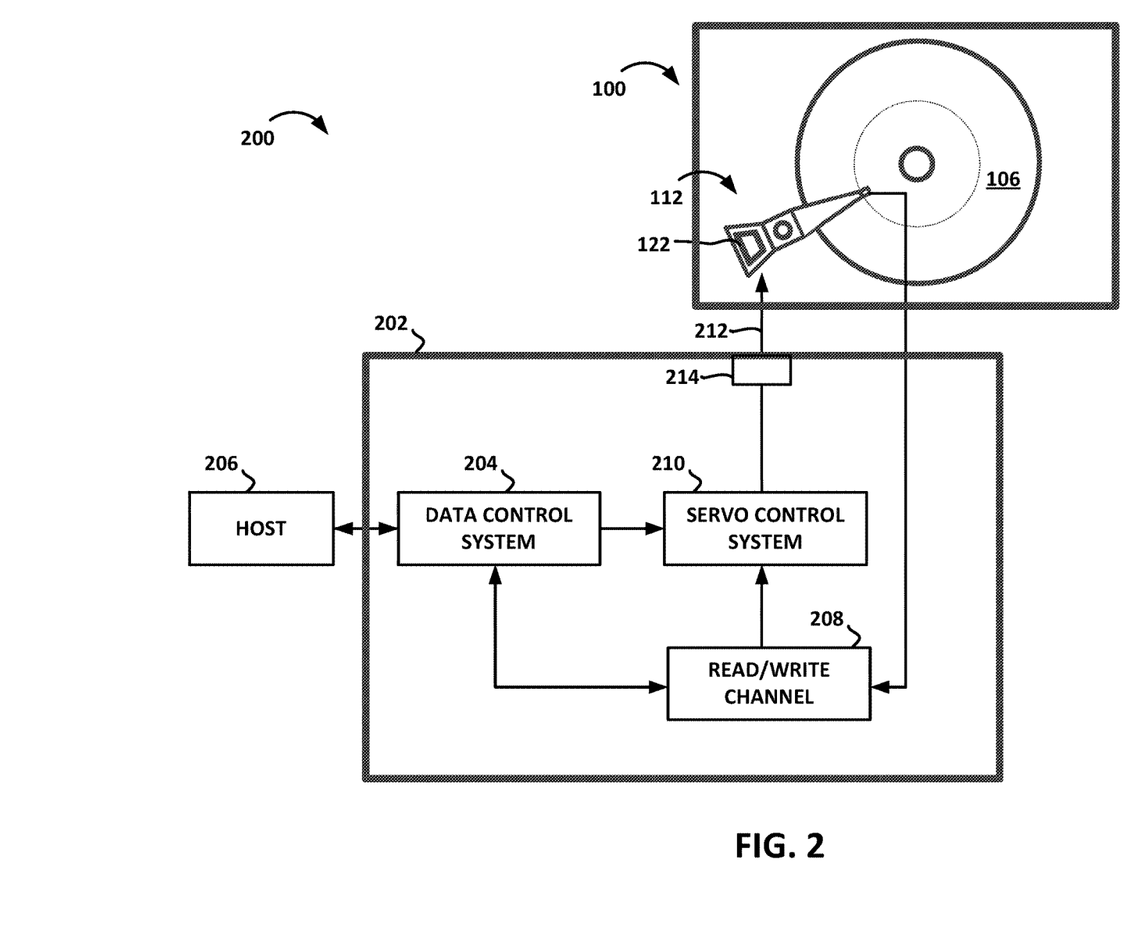
FIG. 2 shows a schematic of a system including a hard drive, in accordance with certain embodiments of the present disclosure.

FIG. 2 shows a schematic of a system 200 including the hard drive 100 and its control circuitry 202. The circuitry 202 includes a data control system 204 that processes read and write commands and associated data from a host device 206. The host device 206 may include any electronic device (e.g., computer, server) that can be communicatively coupled to store and retrieve data from a data storage device. The data controller system 204 is coupled to a read/write channel 208, which converts data to and from digital and analog signals for carrying out read and write operations. To facilitate read/write operations, the read/write channel 208 may include analog and digital circuitry such as preamplifiers, filters, decoders, digital-to-analog converters, timing-correction units, etc. The read/write channel 208 also provides servo data read from servo wedges on the magnetic recording medium 106 to a servo control system 210. The servo control system 210 uses these signals to provide a voice coil motor control signal 212 to the voice coil motor assembly 118 to position the actuator assembly 112 (and therefore read/write heads 116). The control signals 212 are processed (e.g., converted from digital to analog, amplified, filtered) via control interface circuitry 214 coupled to the servo control system 210.

Although two separate controllers (204 and 210) and the read/write channel 208 have been shown for purposes of illustration, it is to be understood that their functionality described herein may be integrated within a common integrated circuit package or distributed among more than one integrated circuit package.

Figure 3:
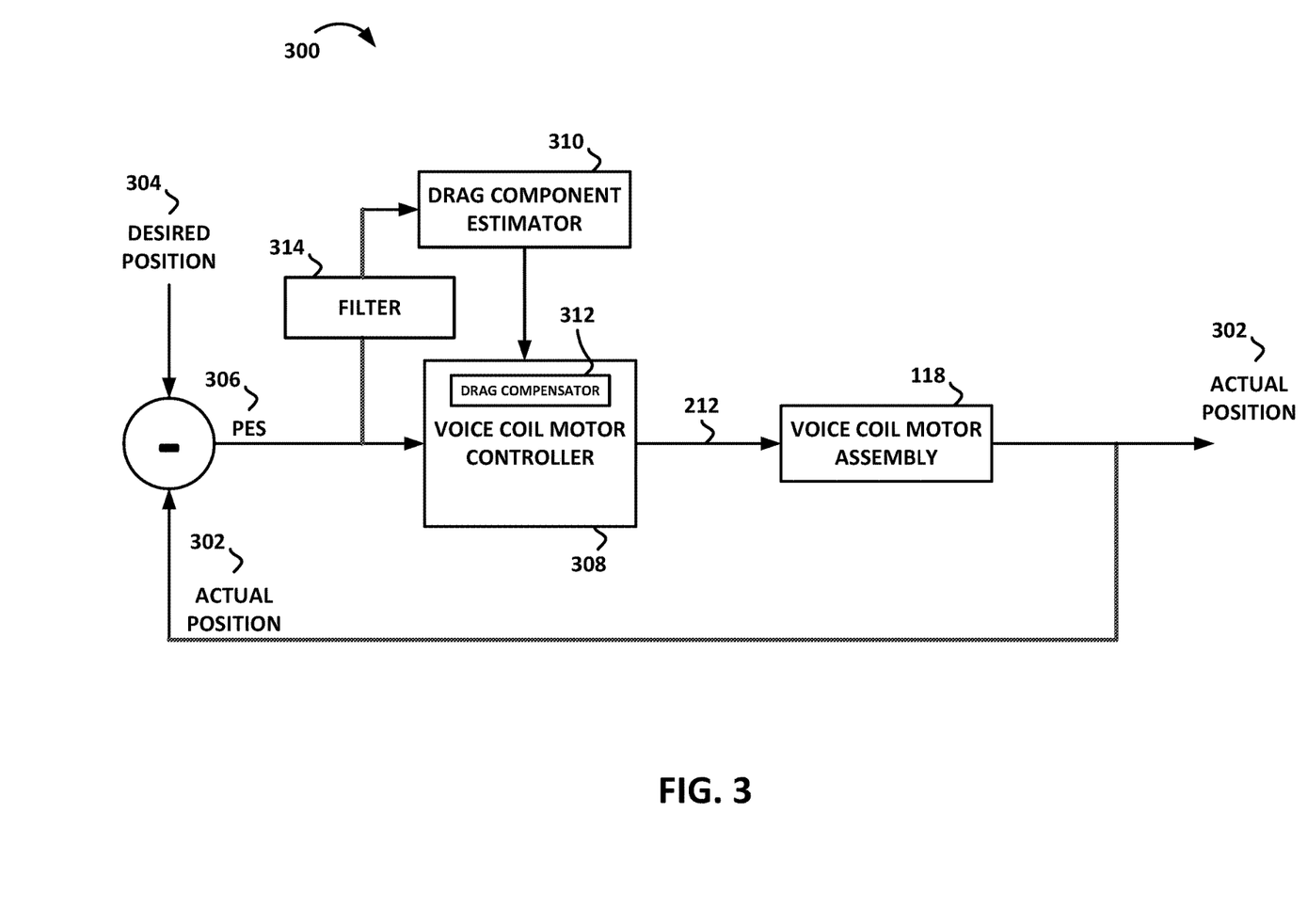
FIG. 3 shows a schematic of a servo control system, in accordance with certain embodiments of the present disclosure.

FIG. 3 provides a high-level representation of a servo control system 300 of the hard drive 100 and which may be implemented as the servo control system 210 shown in FIG. 2. In operation, the read/write heads 116 read servo data (e.g., positioning data) embedded on the magnetic recording discs 106 to determine an actual position 302 of the read/write head 116 relative to tracks on the magnetic recording discs 106. The actual position 302 of the read/write head 116 is subtracted from a desired position 304 of the read/write head 116 to determine a position error signal (PES) 306, which is the difference between where the read/write head 116 is and should be positioned with respect to tracks on the magnetic recording discs 106. The PES 306 is fed into a voice coil motor controller 308, which controls current to the voice coil of the voice coil motor assembly 118 via the voice coil motor control signal 212 to position the read/write head 116 over the desired track. It is appreciated that the actuator assembly 112 may include a dual-stage actuation configuration such that the actuator assembly 112 also includes microactuators that assist the voice coil motor assembly 118 with positioning the read/write heads 116. FIG. 3 shows the servo control system 300 including a drag component estimator 310, a drag compensator 312, and a filter 314, which will be described in more detail below as, individually or collectively, assisting with servo control system performance.

Performance of the servo control system 300—and therefore hard drive 100—can be influenced by a number of factors, including various drag forces associated with the voice coil motor assembly 112. Many of these drag forces change in response to temperature changes. For example, temperature change affects certain properties, like a lubricant's viscosity, within the pivot bearing 120, which is coupled to the voice coil motor assembly 112. As the lubricant's viscosity changes, so does performance of the pivot bearing 120, which affects performance of the voice coil motor assembly 112, which in turn affects performance of the servo control system (e.g., track seeking operations, track settling operations, read errors, and the like). As a result, when drag forces are not accurately accounted for, a DC offset component of the PES (discussed in more detail below)—and therefore the PES itself—becomes unduly large and causes positioning performance errors.

Figure 4A:
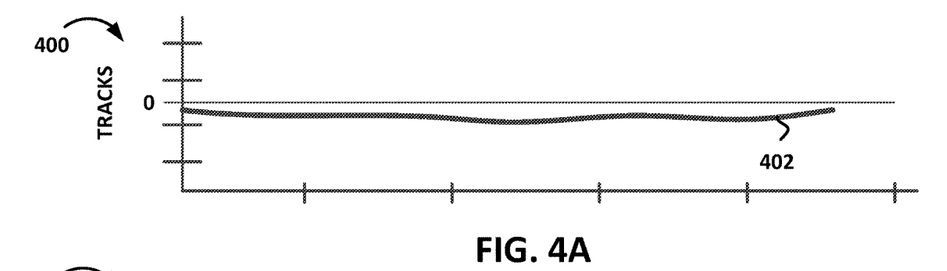
FIGS. 4A-C show plots of a position error signal, in accordance with certain embodiments of the present disclosure.
Figure 4B:
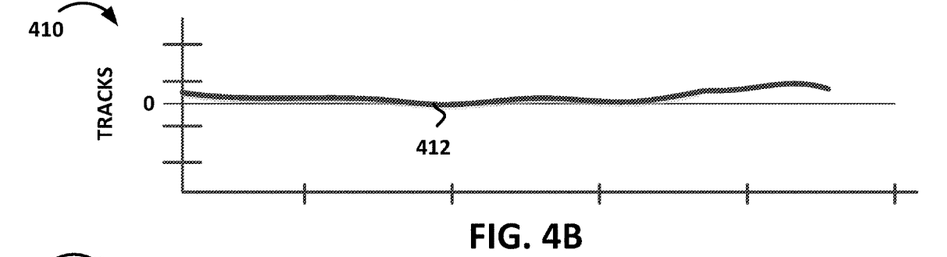
Figure 4C:
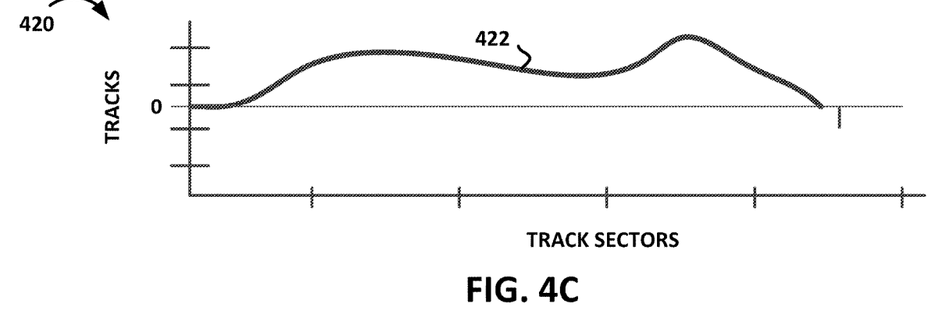

FIGS. 4A-C are provided to show how positioning can be affected as a hard drive operates at different temperatures. These figures provide graphs showing plots of PES measured during seek operations performed at various temperatures where drag forces are not dynamically accounted for. FIG. 4A shows a graph 400 plotting PES 402 over a number of track sectors (horizontal axis). When PES is zero, the read/write is positioned over its target track. When PES deviates above or below zero, this indicates that the read/write head is not positioned as desired and instead is biased towards an outer or inner diameter of a magnetic recording medium. As mentioned above, the graphs shown in FIGS. 4A-C feature plots of PES performed at various temperatures where drag forces are not dynamically accounted for. These figures show that positioning performance changes as temperature changes when such temperature changes are not accounted for. Certain embodiments of the present disclosure are accordingly directed to compensating for performance changes over a range of temperatures.

FIG. 4A represents a seek operation performed at a temperature greater than that of FIGS. 4B-C. It can be seen in FIG. 4A that position errors are occurring such that the read/write head is biased in an off track direction. FIG. 4B shows a graph 410 and represents a seek operation performed at a temperature greater than that of FIG. 4C but less than that of FIG. 4A. It can be seen in FIG. 4B that a magnitude of PES 412 is generally less than that shown in FIG. 4A. FIG. 4C shows a graph 420 and represents a seek operation performed at a temperature less than that of FIGS. 4A-B. It can be seen in FIG. 4C that a magnitude of PES 422 is relatively larger than PES 402 and PES 412 shown in FIGS. 4A-B.

Referring back to FIG. 3, in certain embodiments the servo control system 300 includes a drag component estimator 310 and drag compensator 312 that, individually or collectively, assist with compensating for temperature-based positioning effects (e.g., temperature-dependent drag forces). The drag component estimator 310 is used to modify the voice coil motor control signal 212, which controls operation of the voice coil motor assembly 118. For example, the drag component estimator 310 can send a numerical value (e.g., drag coefficient, drag constant) to a drag compensator 312 of the voice coil motor controller 308 such that one or more parameters (e.g., gain, skew rate) of the voice coil motor control signal 212 are modified. Modifying such parameters impacts the amount and timing of current applied to the voice coil motor assembly 118. For example, in certain embodiments, if temperature changes are such that the voice coil motor assembly 118 would experience more drag during rotation, the drag component estimator 310 may increase an amount of current applied to the voice coil motor assembly 118 such that the time required for the read/write head 116 to seek from one track to another (e.g., seek time) is not negatively impacted by temperature changes. In certain embodiments, the drag component estimator 310 may modify the voice coil motor assembly's acceleration and/or deceleration profile (e.g., rates of change of current) such that the time it takes for the read/write head 116 to settle over a desired track (e.g., settling time) is not negatively impacted by temperature changes.

Figure 5:
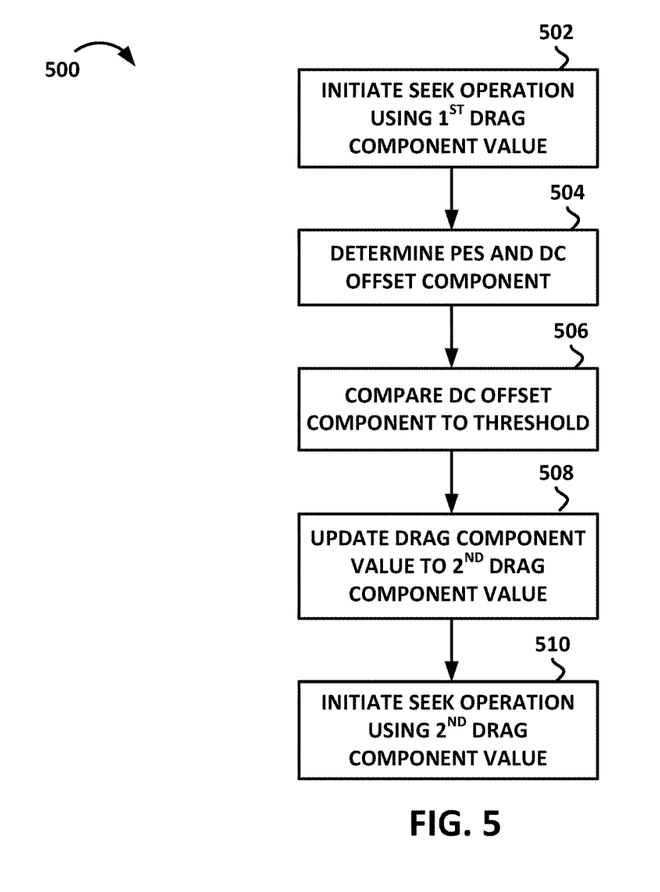
FIG. 5 shows a flow chart of a method for performing seek operations using drag component values, in accordance with certain embodiments of the present disclosure.

FIG. 5 shows a flow chart 500 including various steps to update a drag component value of the drag component estimator 310 for use in modifying a voice coil motor control signal 212. In step 502, a seek operation is initiated such that a current is applied to the voice coil of the voice coil motor assembly 118 to rotate the actuator assembly 112 about pivot bearing 120.

During the seek operation, a position error signal (PES) is determined along with a DC offset component of the PES (step 504). In certain embodiments, the PES value during seek operation is determined by comparing the actual position of the read/write head with the desired position trajectory that is calculated according to seek distance. In certain embodiments, the PES DC offset component is determined only during a coasting period of the seek operation. Generally, a seek operation involves an acceleration period where current to the voice coil motor assembly 118 is rapidly increased to initiate rotation of the actuator assembly 112, followed by a coasting period where a level of current (including situations where no current is applied) is maintained such that the actuator assembly 112 is rotated at a constant velocity, followed by a deceleration period where current is decreased to slow rotation of the actuator assembly 112. However, if a given seek operation is too short, the seek operation may not include a coasting period. As such, the seek operation initiated in step 502 may need to be a longer seek, where the read/write head 116 moves between tracks that are relatively far from each other. In certain embodiments, the average PES and PES DC offset component over the course of a coasting period of a seek operation are determined. In certain embodiments, the PES DC offset component and/or its average during a coasting period of a seek operation may be determined by passing the PES through a low-pass filter 314 to extract the PES DC offset component. For example, the low-pass filter 314 may filter out higher frequency components of the PES. In some embodiments, the filter 314 is only active during the coasting period of the seek operation. As a result, in certain embodiments, the determined DC offset component is a filtered, average DC offset component as measured during a coasting period of a seek operation.

In step 506, the determined DC offset component is compared to a threshold. The threshold value can be set to represent a maximum desired position error. In some embodiments, the threshold DC offset component is set to represent a PES DC offset component value that would likely cause a position error of a certain number of tracks (e.g., 2-track, 5-track, 10-track position errors). The threshold can be set to vary from product to product.

If the DC offset component is determined to be above the threshold, a drag component value is updated (step 508). It should be noted that the DC offset component may be positive or negative and that the threshold can be set to correct both positive and negative DC offset components. As such, a positive threshold and a negative threshold can be set to correct positive and negative DC offset, respectively. In certain embodiments, a positive threshold is set to compare with an absolute value of the PES DC offset component. In certain embodiments, the amount the drag component value changes from seek to seek includes a fixed portion and a variable portion. The fixed portion is a minimum amount the drag component value will be increased or decreased upon determining that the drag component value is to be updated. The fixed portion can be the same value each time the drag component value is updated. The variable portion of the drag component value is proportional to a difference between the PES DC offset component and a target PES DC offset component. The variable portion may be a scaled, proportional value (e.g., difference between the PES DC offset and the target PES DC offset component is multiplied by a constant greater than zero) that is added to the fixed portion to calculate the amount the drag component value will change when the drag component value is updated. The fixed portion can be set to vary from product to product, and the variable portion can be scaled differently from product to product.

Figure 6:
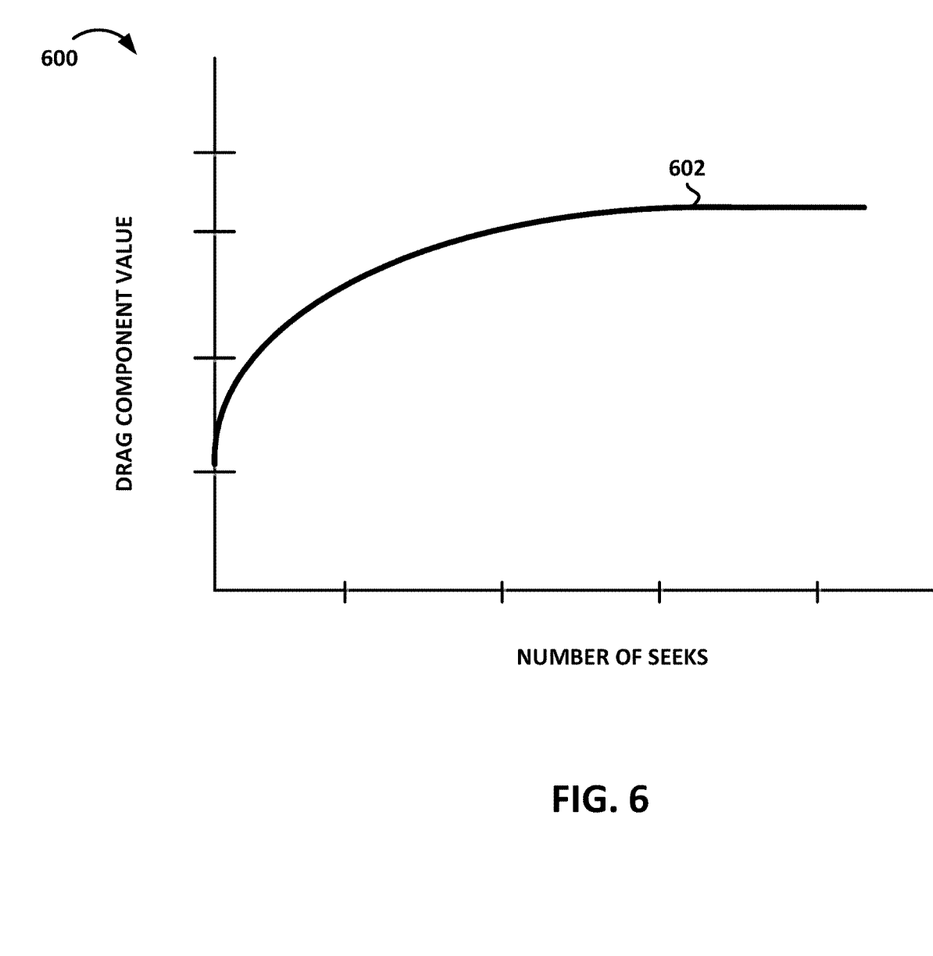
FIG. 6 shows a plot of a drag component value, in accordance with certain embodiments of the present disclosure.

The updated drag component value can then be used during subsequent seek operations (step 510) and may be stored in a table in memory for later use. It could take multiple updates before the drag component value remains steady from seek operation to seek operation (e.g., DC offset component lower than threshold). For example, FIG. 6 shows a graph 600 showing a plot 602 that represents how a value of the drag component 310 changes with the number of seeks. So long as the determined PES DC offset component remains above the threshold, the drag component value will be modified from seek operation to seek operation.

It will be appreciated that, in the embodiments described above, the drag component value is updated without using or requiring use of a temperature sensor—although a temperature sensor can be used independently or in conjunction with the embodiments described in the present disclosure.

Moreover, the various embodiments described above may be implemented using firmware, integrated circuits, and/or software modules that interact with each other or are combined together. For example, the flowcharts and control diagrams illustrated herein may be used to create computer-readable instructions/code for execution by a processor. Such instructions may be stored on a non-transitory computer-readable medium and transferred to the processor for execution. The structures and procedures shown above are only a representative example of embodiments that can be used to provide the functions described hereinabove.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method for operating a hard drive, the method comprising:
    performing a first seek operation using a first voice coil motor (VCM) control signal by utilizing a first drag component value;
    determining a position error signal (PES) and a DC offset component of the PES measured during the first seek operation;
    determining that the DC offset component is above a predetermined threshold;
    in response to determining that the DC offset component is above the predetermined threshold, determining a second drag component value different than the first drag component value; and
    generating a second VCM control signal by applying the second drag component value.

2. The method of claim 1, wherein a difference between the first drag component value and second drag component value is dependent on an amount of difference between the determined DC offset component and a target PES DC offset component.

3. The method of claim 1, wherein a difference between the first drag component value and the second drag component value comprises a fixed portion and a variable portion.

4. The method of claim 3, wherein the fixed portion is the same when a new drag component value is calculated.

5. The method of claim 3, wherein the variable portion is dependent on a difference between the determined DC offset component and a target PES DC offset component.

6. The method of claim 5, wherein the variable portion is proportional to the difference between the determined DC offset component and the target PES DC offset component.

7. The method of claim 6, wherein the variable portion is calculated by multiplying the difference between the determined DC offset component and the target PES DC offset component by a constant greater than zero.

8. The method of claim 1, further comprising:
    initiating a second seek operation using the modified VCM control signal.

9. The method of claim 8, wherein the second drag component value is stored to a table in a memory.

10. The method of claim 1, wherein the DC offset component is determined by calculating an average DC offset component.

11. The method of claim 10, wherein the DC offset component is further determined by passing the PES through a low-pass filter.

12. The method of claim 10, wherein the average DC offset component is calculated by using DC offset component values measured only during a coasting period of the first seek operation.

13. An apparatus for controlling operations of a hard drive, the apparatus comprising:
    control circuitry configured to:
        initiate a first seek operation using a first voice coil motor (VCM) control signal by utilizing a first drag component value;
        determine a DC offset component of a position error signal measured during the first seek operation;
        determine that the DC offset component is above a predetermined threshold; and
        in response to determining the DC offset component is above the predetermined threshold, determine a second drag component value different than the first drag component value.

14. The apparatus of claim 13, wherein the control circuitry is further configured to: generate a second VCM control signal by utilizing the second drag component value.

15. The apparatus of claim 14, further comprising:
a memory, wherein the second drag component value is stored in the memory.

16. The apparatus of claim 14, wherein the control circuitry is further configured to: initiate a second seek operation using the second VCM control signal.

17. The apparatus of claim 13, wherein a difference between the first drag component value and the second drag component value comprises a fixed portion and a variable portion.

18. The apparatus of claim 17, wherein the variable portion is dependent on a difference between the determined DC offset component and a target PES DC offset component.

19. The apparatus of claim 18, wherein the variable portion is proportional to the difference between the determined DC offset component and the target PES DC offset component.

20. The apparatus of claim 19, wherein the variable portion is calculated by multiplying the difference between the determined DC offset component and the target PES DC offset component by a constant greater than zero.

* * * * *

UNITED STATES PATENT AND TRADEMARK OFFICE
CERTIFICATE OF CORRECTION

PATENT NO. : 9,564,158 B1
APPLICATION NO. : 15/153498
DATED : February 7, 2017
INVENTOR(S) : Amar Nath et al.

It is certified that error appears in the above-identified patent and that said Letters Patent is hereby corrected as shown below:

Item "(72) Inventors":
Inventor reads: "Guo Quing Zhang".
Please correct to read: --Guo Qing Zhang--.

Signed and Sealed this
First Day of August, 2017

Joseph Matal
*Performing the Functions and Duties of the*
*Under Secretary of Commerce for Intellectual Property and*
*Director of the United States Patent and Trademark Office*